(No Model.)
2 Sheets—Sheet 1.
G. W. KRAMER.
CAR BRAKE.
No. 522,665.
Patented July 10, 1894.
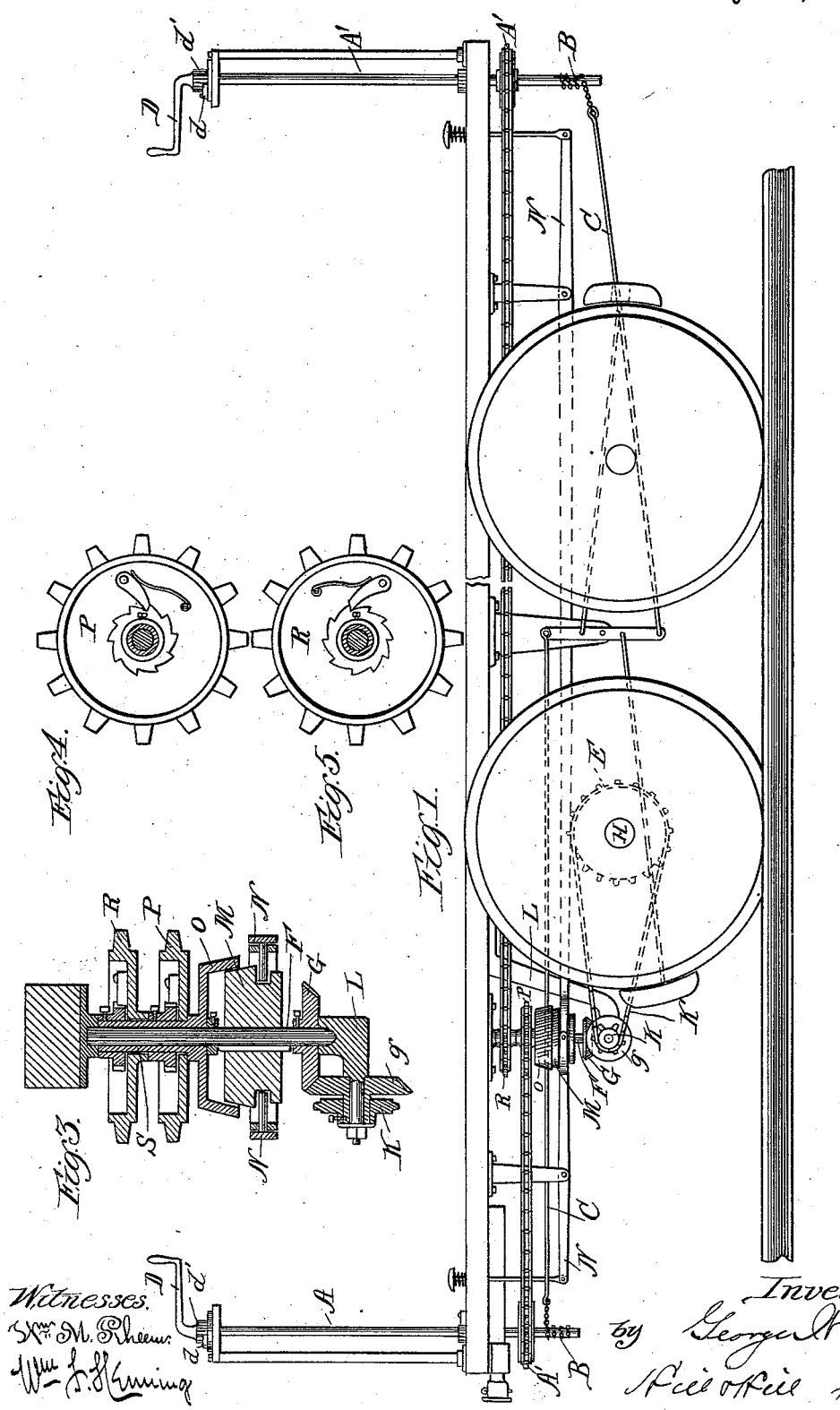
Witnesses.
Inventor
George W. Kramer
by his Attys.

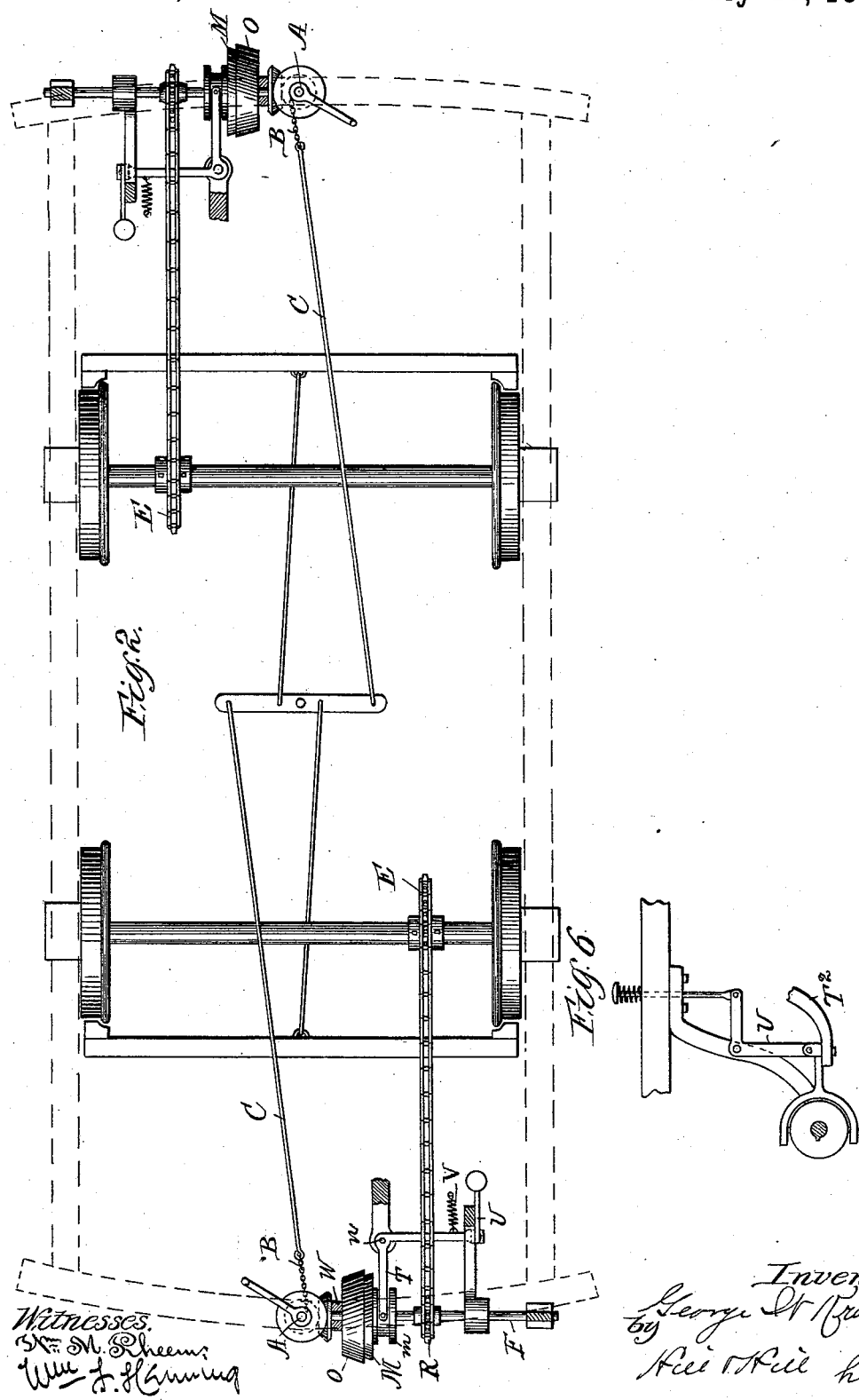

UNITED STATES PATENT OFFICE.

GEORGE W. KRAMER, OF PEORIA, ILLINOIS.

CAR-BRAKE.

SPECIFICATION forming part of Letters Patent No. 522,665, dated July 10, 1894.

Application filed November 6, 1893. Serial No. 490,115. (No model.)

*To all whom it may concern:*

Be it known that I, GEORGE W. KRAMER, a citizen of the United States of America, residing at Peoria, county of Peoria, and State of Illinois, have invented certain new and useful Improvements in Means for Applying Brakes to Car-Wheels, of which the following is a specification.

Referring to the accompanying drawings, wherein like reference letters indicate like or corresponding parts,—Figure 1 is a side elevation of the floor and wheels of a car, showing the brake mechanism with my improvement attached; Fig. 2, a floor plan of a car showing a modification of the same; Fig. 3, a section of the clutch device and the adjacent parts, and Figs. 4, 5 and 6 are respectively detail views of the special form of construction shown in Fig. 2.

My invention consists in the application of a new and improved device to the brake system, whereby the brakes may be set, ordinarily, in the usual manner, but when an emergency stop is made, that is to say in times of danger and a very quick stop is necessary, the rotation of one or more of the car-wheel axles, and thus the momentum of the car, may be utilized to set the brakes very quickly and with great force.

In the preferred construction herein shown, I show my improvement applied to a car having the usual brake-stem A at each end of the car, by means of which the chain B, attached to the brake-rod C, operates the brake in the well-known way. The handle D is preferably loosely secured to the brake-stem so as to allow an independent rotation of the same, while a pawl d and ratchet d' enable the stem to be rotated by the handle.

In the preferred form shown in Fig. 1, I support a vertical shaft F, from the bottom of the car in any suitable manner. At the lower end of the shaft I fix a beveled pinion G which gears with a similar pinion g. This pinion is driven by means of a sprocket wheel E upon the car axle, and the sprocket wheel K rotating with said pinion g and a sprocket chain K' connecting the two. The pinion g, and sprocket wheel K are supported by the hanger L depending from the car bottom.

Mounted upon the shaft F above the pinion G in such a manner as to rotate therewith and also permit a longitudinal movement thereon, is a conical friction clutch member M, the foot lever N controlling such longitudinal movement.

Loosely mounted on the shaft F, is a sleeve S, which carries a clutch bowl O, and two sprocket wheels P, and R. The clutch cone M engages with the bowl O, and thus rotates the sleeve S and also the wheels P, R which may be so mounted on the sleeve S as to rotate with the same whenever it is actuated by the clutching device. I prefer, however, to mount the said sprocket wheels on the sleeve with pawl and ratchet (see Figs. 4 and 5) so that each brake-stem will be rotated in the one direction only depending upon which direction the car is running.

Upon the lower end of the brake-stem is mounted a sprocket wheel A' which preferably rotates with the said stem by reason of a ratchet and pawl connection with the same, and a sprocket chain connects said wheel A' to either the wheel P or R as the case may be.

The foot levers N may be operated from either end of the car and are pivotally connected to the collar which controls the friction cone.

The mode of operation is as follows: In cases where ordinary stops are made, the brake if preferred may be applied by revolving the brake-stem by the handle in the usual manner, but in cases when an emergency arises and a very quick stop is necessary, the brakeman, or motor man, places his foot upon the connection to the foot lever, which moves the revolving clutch cone into engagement with the bowl, the sprocket wheels P, R, are actuated and the brake-stem, by reason of its sprocket connection is also actuated. The brake is thus quickly set with great power.

It is obvious intermediate gear may be dispensed with, if preferred, and the clutch device be mounted directly upon the brake-stem, as shown in Fig. 2. In such construction, I prefer to arrange my improvement at each end of the car upon the brake-stem, and have the operator use either one according to the direction the car is going. In carrying out this construction the shaft F is mounted or positioned horizontally beneath or under the car floor. The sleeve S is dispensed with and only one sprocket wheel R is necessary, the device being duplicated at the other end of the car. The clutch cone M in this instance is provided with a collar $m$, embraced by the bifurcated end of a bell crank lever T pivoted at $n$, to the hanger $T^2$ suspended from the car floor and which lever T is in a horizontal position. The lever T is linked with the vertical bell crank lever U which latter is in turn linked with the operating rod or foot lever N. A spring V normally causes the clutch cone M to remain disengaged. By this means a downward thrust of the foot lever or rod N operates the bell crank levers U and T and engages the clutch cone M with the clutch bowl O, which, as the latter, together with the beveled pinion G are fixed on the sleeve W, causes a rotation of said clutch bowl and pinion, communicating this movement by the pinion $g$, to the brake-staff A.

I do not wish to limit myself to the exact construction shown, as the broad idea of my invention rests in so constructing a brake setting device that in emergencies the momentum of the car may be employed to rotate the brake-stem and thus apply the brake quickly and with great force.

Having thus described my invention, what I claim as new, and desire to secure by Letters Patent, is—

1. As a means of applying the brakes of cars, a friction clutch cone mounted upon and rotating with a shaft, supported by the car, in such manner as to be longitudinally movable on said shaft; a cup shaped bowl loosely mounted upon the same shaft, adapted to be engaged by said cone; and means for moving the cone longitudinally to engage said bowl; in combination with means for imparting the rotation of the car axle to the clutch cone and means for transmitting the rotation of the clutch bowl to the brake-stem; substantially as and for the purposes described.

2. In a device of the kind described, a friction clutch composed of a conical shaped member, and a bowl shaped member; means for driving one of said members by a connection with the car-axle; and means for engaging the driven member with the other to intermittently operate it; in combination with means for transmitting the rotation of the intermittently driven member to the brake-stem; substantially as and for the purpose set forth.

3. In a device of the kind described, a friction clutch cone mounted upon and rotating with a shaft supported by the car, in such a manner as to be longitudinally movable on said shaft; a cup-shaped bowl loosely mounted upon the same shaft, adapted to be engaged by said cone; means for moving the cone longitudinally to engage with and rotate said bowl; and means for transmitting the rotation of the bowl to the brake-stem; in combination with a sprocket wheel mounted upon and rotating with the wheel axle of the car; a similar sprocket wheel fixed upon the shaft operating the cone; and a sprocket chain connecting the two wheels; whereby the rotation of the car axle is first transmitted to the cone, and thence, at will, may be transmitted to the brake-stem to set the brake; substantially as set forth.

GEORGE W. KRAMER.

Witnesses:
W. F. ROBINSON,
W. J. LYNCH.